UNITED STATES PATENT OFFICE.

THOMAS H. JONES, OF CHICAGO, ILLINOIS, ASSIGNOR TO HIMSELF AND L. CLARENCE NOBLE, OF SAME PLACE.

METHOD OF PREVENTING BOILER INCRUSTATION.

SPECIFICATION forming part of Letters Patent No. 668,820, dated February 26, 1901.

Application filed October 22, 1900. Serial No. 33,995. (No specimens.)

*To all whom it may concern:*

Be it known that I, THOMAS H. JONES, a citizen of the United States, residing in Chicago, in the county of Cook and State of Illinois, have invented a new and useful Improvement in Methods of Preventing Incrustation in Boilers, of which the following is a specification.

This invention relates to improvements in the art or method of preventing incrustations in steam-boilers.

It has been known for some time that by passing the water over or in contact with mercury, or over both mercury and zinc, prior to its entering the boiler measurably good results could be obtained in preventing incrustation, and I have shown in my Patent No. 549,570, of November 12, 1895, an apparatus for thus subjecting the water to contact with mercury. I have now discovered by experiment that the incrustation can be wholly prevented by subjecting the water not only to contact with mercury or with mercury and zinc, but also to impregnation with bicarbonate of soda or its chemical equivalent; and the present invention consists, substantially, in subjecting the water admitted to the boiler to contact with metallic mercury or with both mercury and zinc and also to impregnation with bicarbonate of soda or its chemical equivalent.

A practical method of carrying out my invention is to mix with the water, either prior to or at the time of its entering the feed pump or injector, a quantity of bicarbonate of soda, and also to conduct the water, while *en route* to the boiler, over or in contact with metallic mercury or over both mercury and zinc. The latter feature of the process may be effected in any suitable apparatus—as, for instance, that shown in my said patent. The impregnating material may be administered periodically—as, for instance, once a day—and it is most conveniently done in the manner described, though it may be mixed with the water at any point in its course to or even after its entrance into the boiler. Enough can be supplied at one charge to continue its work in the boiler during an ordinary day's run.

Among the chemical equivalents of the soda which can be used in its stead in practicing my process of treating the water I would enumerate the carbonates and bicarbonates, both crude and purified, of the alkali metals and the carbonates and bicarbonates, both crude and purified, of the metals of the alkaline earths, also the neutral and basic phosphates, both crude and purified, of the alkali metals and of the metals of the alkaline earths; but I do not wish to be limited to these.

I am aware that bicarbonate of soda has been added to the water for preventing incrustation; but the bicarbonate of soda will only partially prevent incrustation, and the same is also true of mercury and of combined mercury and zinc. By combining the two materials, the chemical and the metallic, I completely prevent the incrustation.

I claim—

1. The process of treating water for the prevention of incrustation, consisting in subjecting the water to contact with mercury and also impregnating it with bicarbonate of soda, substantially as specified.

2. The process of treating water for the prevention of incrustation, consisting in subjecting the water to contact with mercury and zinc, and also impregnating it with bicarbonate of soda, substantially as specified.

3. The process of treating water for the prevention of incrustation, consisting in subjecting the water to contact with mercury and also impregnating it periodically with bicarbonate of soda, substantially as specified.

THOMAS H. JONES.

Witnesses:
EDW. S. EVARTS,
L. C. NOBLE.